(12) United States Patent
Call et al.

(10) Patent No.: US 10,179,580 B2
(45) Date of Patent: Jan. 15, 2019

(54) BRAKE CYLINDER MAINTAINING WITH IMPROVED PRESSURE REGULATION

(71) Applicant: NEW YORK AIR BRAKE, LLC, Watertown, NY (US)

(72) Inventors: Derick Call, Evans Mills, NY (US); Howard E. Huber, Jr., Black River, NY (US); Brian Graves, Croghan, NY (US)

(73) Assignee: New York Air Brake, LLC, Watertown, NY (US)

( * ) Notice: Subject to any disclaimer, the term of this patent is extended or adjusted under 35 U.S.C. 154(b) by 19 days.

(21) Appl. No.: 14/523,457

(22) Filed: Oct. 24, 2014

(65) Prior Publication Data
US 2016/0114776 A1 Apr. 28, 2016

(51) Int. Cl.
*B60T 17/22* (2006.01)
*B60T 15/30* (2006.01)
*B60T 17/04* (2006.01)

(52) U.S. Cl.
CPC .......... *B60T 15/302* (2013.01); *B60T 17/04* (2013.01)

(58) Field of Classification Search
CPC ...... B60T 15/22; B60T 15/223; B60T 15/226; B60T 15/184; B60T 15/185; B60T 15/302; B60T 15/304; B60T 15/022; B60T 15/024; B60T 15/42; B60T 17/228; B60T 13/665; B60T 11/28; F16K 17/196; F16K 17/18
USPC ........................................ 137/505.18; 303/60
See application file for complete search history.

(56) References Cited

U.S. PATENT DOCUMENTS

| | | | | |
|---|---|---|---|---|
| 435,783 A | * | 9/1890 | Welsh et al. | B60T 17/228 116/55 |
| 479,439 A | * | 7/1892 | Manning | B60T 15/42 303/82 |
| 538,544 A | * | 4/1895 | Shortt | B60T 15/42 303/66 |
| 1,540,017 A | * | 6/1925 | Kendall | B60T 13/665 251/30.01 |
| 1,956,666 A | * | 5/1934 | Campbell | B60T 15/46 303/35 |
| 3,059,976 A | * | 10/1962 | Whelan | B60T 8/1818 137/625.26 |

(Continued)

FOREIGN PATENT DOCUMENTS

DE 102009025502 A1 12/2010
GB 2103739 A 2/1983

OTHER PUBLICATIONS

International Search Report Form PCT/ISA/220, International Application No. PCT/US2014/062217, dated Jul. 24, 2015, pp. 1-9.

*Primary Examiner* — Bradley T King
*Assistant Examiner* — Stephen M Bowes
(74) *Attorney, Agent, or Firm* — Bond Schoeneck and King PLLC; David Nocilly (57) ABSTRACT

A brake cylinder maintaining system that combines a brake cylinder maintaining check valve and a quick service limiting valve into a single unit to have lower hysteresis, and thus more precise BCM regulation pressure and a smaller pressure offset. The check valve and quick service valve are coupled to provide a single system having multiple valve seats for selective communication between quick service pressure and brake cylinder pressure on one hand, and between a brake cylinder maintaining pressure and brake cylinder pressure on the other hand.

5 Claims, 5 Drawing Sheets

(56) References Cited

U.S. PATENT DOCUMENTS

| | | | | |
|---|---|---|---|---|
| 3,151,914 A | * | 10/1964 | Stelzer | B60T 13/403 |
| | | | | 137/627.5 |
| 3,228,731 A | * | 1/1966 | Valentine | B60T 8/1825 |
| | | | | 137/627.5 |
| 3,404,922 A | * | 10/1968 | Valentine | B60T 8/1825 |
| | | | | 303/22.8 |
| 3,428,070 A | * | 2/1969 | Valentine | B60T 17/081 |
| | | | | 137/102 |
| 3,545,471 A | * | 12/1970 | Taplin | G05D 16/0641 |
| | | | | 137/116.5 |
| 3,734,575 A | * | 5/1973 | Paginton | B60T 17/20 |
| | | | | 303/33 |
| 3,950,035 A | * | 4/1976 | Tribe | B60T 8/5068 |
| | | | | 303/118.1 |
| 2002/0038976 A1 | | 4/2002 | Hart et al. | |

\* cited by examiner

BRAKE CYLINDER MAINTAINING WITH IMPROVED PRESSURE REGULATION

BACKGROUND OF THE INVENTION

1. Field of the Invention

The present invention relates to brake cylinder maintaining systems and, more particularly, to a combined brake cylinder maintaining check valve and quick service limiting valve.

2. Description of the Related Art

Control valves are used in freight car braking systems to supply air pressure to the brake cylinders of a freight car. If the plumbing between the control valve and the freight car has a leak or there is a leak in the brake cylinder itself, however, then the brake cylinder will not maintain the original set pressure. One approach for addressing this problem is to have a valve that maintains the brake cylinder pressure. When the pressure in the brake cylinder drops below its original set pressure, a brake cylinder maintaining valve may feed brake pipe pressure through a choke to replenish and maintain the brake cylinder pressure up to a designed point. For example, one conventional brake cylinder maintaining (BCM) system for the service portion of a AAR-type control valve includes a BCM charging check valve to reduce brake cylinder pressure by an amount equal to the quick service limiting valve (8-12 psi) plus an amount equal to the sum of the hysteresis, part to part variations, and environmental variations, so that the resulting brake cylinder reference pressure acting on the BCM control side of the diaphragm of the quick service limiting valve plus the quick service limiting valve spring setting (8-12 psi) will always be less than the target/actual brake cylinder pressure.

Because of the aforementioned sources of variation, it is necessary to set the BCM charging check valve cracking value at 16 to 18 psi. This results in an undesired loss of efficiency of BCM pressure regulation, as the actual brake cylinder pressure would have to leak an amount equal to or greater than the 4-10 psi offset of the BCM charging check before the BCM valve will open to replenish brake cylinder pressure. As a result, a more precise BCM regulation pressure is needed, with a smaller pressure offset, for more accurate and improved brake cylinder maintaining.

BRIEF SUMMARY OF THE INVENTION

The present invention comprises a brake cylinder maintaining (BCM) system having low hysteresis, thereby providing for more precise BCM regulation pressure and smaller pressure offset. The system includes a BCM charging check valve that is integrated into a quick service limiting valve (QSLV) valve. By combining these functions, significant sources of part to part and environmental variations are eliminated and more precise control of the BCM valve is possible. The combined quick service check valve and brake cylinder maintaining valve has a first seat for selectively allowing communication between a brake cylinder pressure chamber and a brake cylinder maintaining pressure chamber and a second seat for selecting allowing communication between the brake cylinder pressure chamber and a quick service pressure chamber. The first seat is normally closed and opens in response to a first predetermined amount of pressurization of the brake cylinder pressure chamber and the second seat is normally open and closes in response to a second predetermined amount of pressurization of the brake cylinder pressure chamber. A diaphragm separates the brake cylinder maintaining pressure chamber and the brake cylinder pressure chamber so that compression of the diaphragm toward the brake cylinder maintaining pressure chamber closes the second seat to prevent communication between the brake cylinder pressure chamber and the quick service pressure chamber. If there is additional compression of the diaphragm toward the brake cylinder maintaining pressure chamber opens the first seat to allow communication between the brake cylinder pressure chamber and the brake cylinder maintaining pressure chamber. The diaphragm is biased from the brake cylinder maintaining pressure chamber toward the brake cylinder pressure chamber so that the first seat is closed and the second seat is open when the pressure in the brake cylinder pressure chamber is less than the first predetermined amount. Preferably, the first predetermined amount is about 10 psi.

A first embodiment of the invention comprises a valve having a needle passing through the diaphragm and having a channel therethrough that is in communication with the brake cylinder maintaining pressure chamber at one end and is open on the opposing end. The valve further includes a check positioned in the quick service pressure chamber that is biased toward the needle to close the open end of the channel of the needle. Movement of the diaphragm and needle toward the brake cylinder maintaining pressure chamber allows the check to move and close the second seat, thereby preventing communication between the brake cylinder pressure chamber and the quick service pressure chamber. Further movement of the diaphragm toward the brake cylinder maintaining pressure chamber will separate the open end of the channel of the needle from the check and bring the open end of the channel into communication with the brake cylinder pressure chamber, thereby opening the first seat and allowing communication between the brake cylinder pressure chamber and the brake cylinder maintaining pressure chamber.

In another embodiment of the invention, the valve includes a first stem passing through the diaphragm and defining a passageway between the brake cylinder maintaining pressure chamber and the brake cylinder pressure chamber and a valve head positioned on an end of the valve stem for movement into and out of engagement with the diaphragm, thereby closing or opening the passageway, respectively. A second stem having a post associated with the first stem that extends through the brake cylinder pressure chamber into the quick service pressure chamber. A check is positioned in the quick service pressure chamber and biased toward the post of the second stem so that the check may close the second seat, thereby closing communication between the brake cylinder pressure chamber and the quick service pressure chamber, when the post moves a predetermined distance toward the brake cylinder maintaining pressure chamber. If the diaphragm moves further, the valve head separates from the diaphragm, thereby opening the first seat and allowing communication between the brake cylinder pressure chamber and the brake cylinder maintaining pressure chamber.

In yet another embodiment of the invention, the valve includes a guide positioned in the diaphragm and a stem having a taper passing through the guide to define a passageway between the brake cylinder maintaining pressure chamber and the brake cylinder pressure chamber. An O-ring engages the taper of the valve step and closing the passageway when the first seat is closed.

In a further embodiment of the invention, the valve includes a diaphragm having a hole formed therethrough that is sealingly engaged by an end of a valve stem positioned in the brake cylinder pressure chamber for selective opening and closing of the hole in the diaphragm. The opposing end of the valve stem engages a check positioned in the quick service pressure chamber and biased toward the valve stem so that the check may close the second seat when the stem moves a predetermined distance toward the brake cylinder maintaining pressure chamber. The valve stem is biased toward the diaphragm by a spring positioned in the brake cylinder pressure chamber.

In an additional embodiment of the invention, the valve includes a first stem engaged with one side of the diaphragm and extending through the brake cylinder maintaining pressure chamber into a portion of the brake cylinder pressure chamber to define a passageway therebetween, wherein the first stem engages a check that is biased to close the passageway if the stem is moved out of the portion of the brake cylinder pressure chamber. The valve also includes a second stem engaged with the opposing side of the diaphragm and extending through a second portion of the brake cylinder pressure into the quick service pressure chamber to define a second passageway extending between the brake cylinder pressure chamber and the quick service pressure chamber, wherein the second stem engages a second check that is biased to close the second passageway if the second stem is moved out of the quick service pressure chamber.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
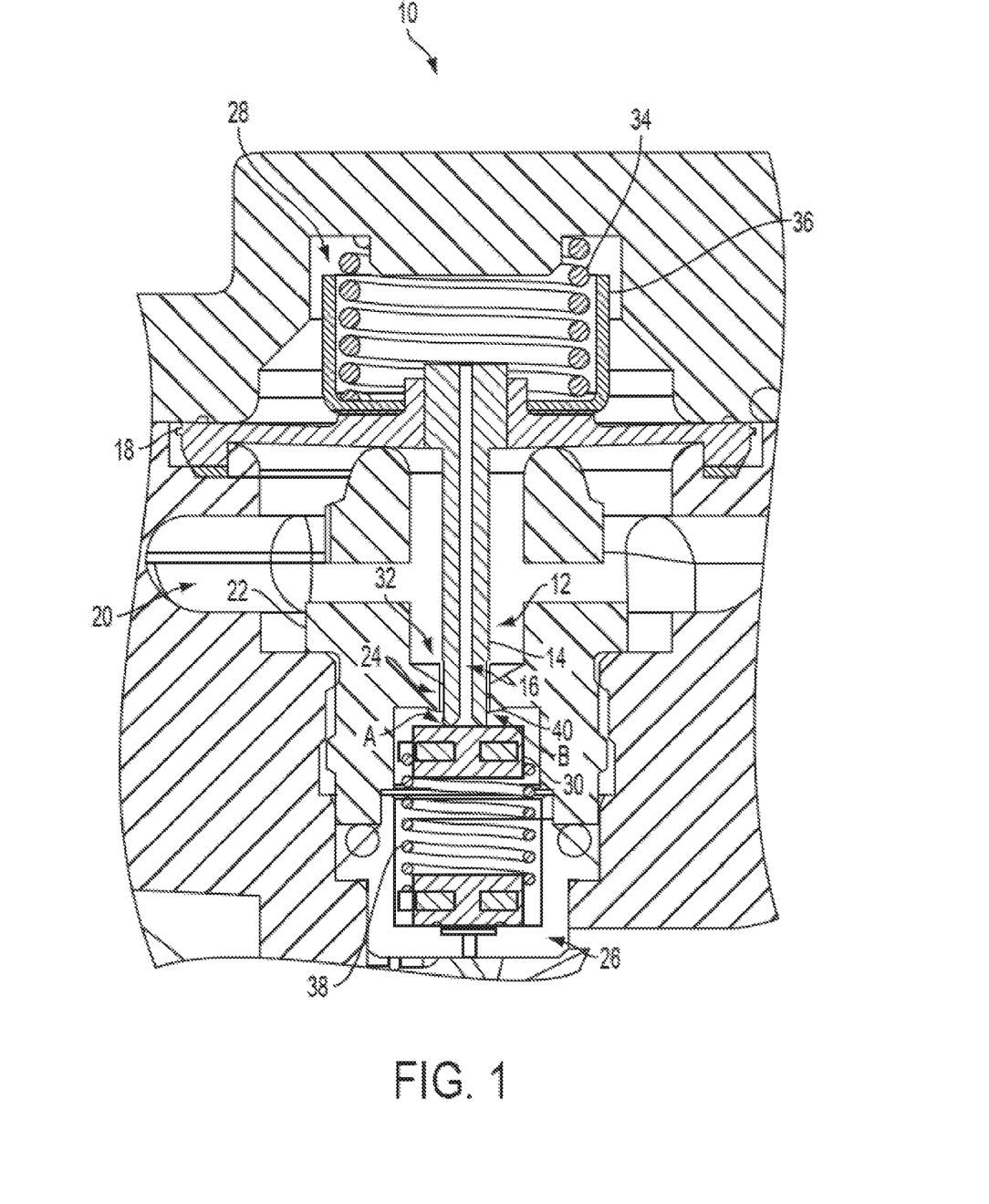
FIG. 1 is a cross-sectional view of a first embodiment of a combined BCM reference pressure charging check valve and quick service limiting valve according to the present invention.

Referring now to the drawings, wherein like reference numerals refer to like parts throughout, there is seen in FIG. 1 a first embodiment of a brake cylinder maintaining valve 10 that integrates a quick service limiting valve and a BCM reference pressure charging check valve into a single unitary structure that cooperates to provide all of the relevant functions with more precise control that otherwise possible. Valve 10 comprises a check valve assembly 12 having a nozzle 14 with a channel 16 formed therethrough that is attached to and extends through a quick service limiting valve (QSLV) diaphragm 18. Nozzle 14 extends along a longitudinal axis through a brake cylinder pressure chamber 20 in an upper portion of a bushing 22 and through a narrow passageway 24 that separates brake cylinder pressure chamber 20 from a quick service pressure chamber 26 defined in a lower portion of bushing 22. It should be recognized that the various chambers are in communication with the corresponding elements of a conventional braking system such that the pressure in a particular chamber reflects the pressure in the corresponding element of the braking system. For example, brake cylinder pressure chamber 20 is in open communication with a brake cylinder (not shown) so that the pressure in chamber 20 reflects the pressure in the brake cylinder.

Nozzle 14 extends through brake cylinder pressure chamber 20 and into quick service pressure chamber 26 to define a first seat A, which selectively controls communication between a BCM reference pressure chamber 28 positioned above QSLV diaphragm 18 and brake cylinder pressure chamber 20, as well as a second seat B, which selectively controls communication between quick service pressure chamber 26 and brake cylinder pressure chamber 20. Seat A is formed between the end of nozzle 14 and a check 30 positioned in quick service pressure chamber 26 so that check 30 is in contact with the end of nozzle 14, seat A will be closed to seal off channel 16. A second seat B is formed by a clearance gap 32 between the outer surface of nozzle 14 and the interior of passageway 24.

A QSLV spring 34 is positioned in a spring guide 36 and configured to bias QSLV diaphragm 18 and nozzle 14 downwardly so check valve 12 is closed at seat A and open at seat B when the pressure in brake cylinder pressure chamber 20 is less than a nominal amount, such as 10 psi. By contrast, check 30 in quick service pressure chamber 26 is biased longitudinally upward by a spring 38 to maintain engagement with the end of nozzle 14 until nozzle 14 withdraws from quick service pressure chamber 26 and check 30 is biased upwardly into engagement with a bead seat 40 surrounding the lower end of passageway 24, thereby closing seat B. As nozzle 14 continues to withdraw into brake cylinder pressure chamber 20, and thus away from bead seat 40 and the stationary check 30, seat A is opened to allow communication between brake cylinder pressure chamber 20 and BCM reference pressure chamber 28 via channel 16 in nozzle 14.

In a brake application, after preliminary quick service, quick service pressure chamber 26 will be pressurized by brake pipe pressure as in a conventional braking system. In valve 10, however, the brake pipe pressure in quick service pressure chamber 26 will flow through open seat B, thereby pressurizing brake cylinder pressure chamber 20 on the underside of QSLV diaphragm 18 and thus pressurizing the brake cylinder which is in open communication with brake cylinder pressure chamber 20. When brake cylinder pressure chamber 20 under QSLV diaphragm 18 reaches a predetermined amount, such as approximately 10 psi, diaphragm 18 and nozzle 14 move upward. Check 30 will then be biased upwardly by spring 38 and will close against bead seat 40 while nozzle 14 continues to move upward, thereby severing the communication between brake pipe pressure in quick service pressure chamber 26 and brake cylinder pressure chamber 20 (and thus the brake cylinder). As brake cylinder pressure increases further, diaphragm 18 and nozzle 14 will continue to move upward so that nozzle 14 enters brake cylinder pressure chamber 20, while seat B remains closed and check 30 is stopped in the closed position by bead seat 40, thereby allowing nozzle 14 to disengage from check 30 and move into brake cylinder pressure chamber 20 while seat A opens. When seat A opens, brake cylinder pressure in brake cylinder pressure chamber 20 can then flow through nozzle 14 to the top side of QSLV diaphragm 18. Seat A closes when the sum of the pressure in BCM reference pressure chamber 28 acting over the upper area of diaphragm 18 plus the force provided by QSLV spring 34 is equal to or greater than the pressure in brake cylinder pressure chamber 20 acting on the underside of diaphragm 18. As a result, BCM reference pressure 28 is almost precisely the amount required for a zero-loss BCM function.

In a brakes applied position, QSLV diaphragm 18 goes to a lap state, where both seat A and seat B are closed. If there is a leak leading to the loss of pressure in the brake cylinder, the pressure in brake cylinder pressure chamber 20 on the underside of QSLV diaphragm 18 will be reduced and diaphragm 18 will move nozzle 14 downward, thereby pushing check 30 against the bias of spring 38 and opening seat B. As a result, brake pipe pressure may flow from quick service pressure chamber 26 through open seat B to the brake cylinder via brake cylinder pressure chamber 20 until a pressure balance is restored across QSLV diaphragm 18.

Figure 2:
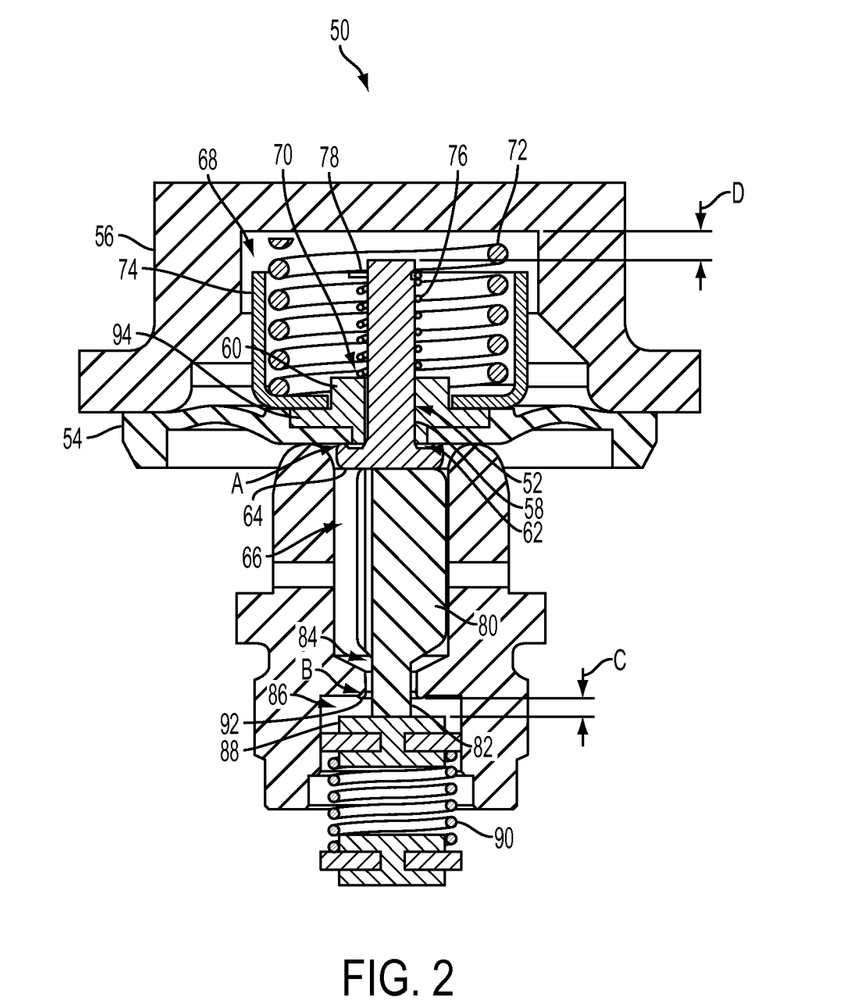
FIG. 2 is a cross-sectional view of a second embodiment of a combined BCM reference pressure charging check valve and quick service limiting valve according to the present invention.

Additional embodiments, such as the second, third, fourth and fifth embodiments discussed below, may be structured to add a predefined amount of hysteresis or pressure offset to the BCM reference pressure to provide added valve stability. For example, in a second embodiment of a combined quick service check valve and brake cylinder maintaining valve 50, a normally closed check valve 52 is integrated into a QSLV diaphragm 54 under a valve cover 56. Check valve 52 includes a first valve stem 58 that passes through a valve guide 60 positioned in an opening 62 in QSLV diaphragm 54. A valve head 64 positioned on the lower side of QSLV diaphragm 54 defines a first seat A between the edge of valve head 64 and the lower side of QSLV diaphragm 54. Seat A allows for selective communication between a brake cylinder pressure chamber 66 positioned below QSLV diaphragm 54 and a BCM reference pressure chamber 68 positioned above QSLV diaphragm 52 via a clearance gap 70 between valve guide 60 and valve stem 58. QSLV diaphragm 52 is biased downwardly by a QSLV spring 72 positioned in a spring guide 74 so that seat A is normally closed. First valve stem 58 is also biased by a spring 76 that engages a retaining ring 78 positioned at the upper end of valve stem 58 to hold valve head 64 into engagement with QSLV diaphragm 52. As explained below, however, valve head 64 will separate from QSLV diaphragm 52 if first valve stem 58 moves upwardly distance D into contact with valve cover 56.

As further seen in FIG. 2, first valve stem 58 cooperates with a second valve stem 80 that is positioned in brake cylinder pressure chamber 60 and that includes a post 82 extending through an passageway 84 into a quick service pressure chamber 86. Post 82 is moveable into engagement with a check 88 to define a second seat B. Check 88 is biased upwardly against post 82 by a spring 90 and can move through a distance C before engaging a bead seat 92 and closing off passageway 84. Post 92 does not completely occupy passageway 84, thereby allowing for communication between quick service pressure chamber 86 and brake cylinder pressure chamber 66 when check 88 has not closed passageway 84. Second seat B therefore allows for selective opening of communication between quick service pressure chamber 86 and brake cylinder pressure chamber 66 when post 92 has opened seat B against the bias of spring 90 and for closing of communication when post 92 is withdrawn by the movement of second valve stem 80 to allow check 88 to be biased into the closed position by spring 90.

When a brake application is made, brake pipe pressure initially flows from quick service pressure chamber 86 through open valve seat B to the underside of QSLV diaphragm 54 and brake cylinder pressure chamber 66 (and thus the brake cylinder). When the brake cylinder pressure in brake cylinder pressure chamber 66 reaches a threshold, e.g., nominally 10 psi, QSLV diaphragm 54 moves upward through distance C until valve seat B closes, thereby severing the communication between the brake pipe and the brake cylinder. As the brake cylinder pressure increases further, QSLV diaphragm 54 will continue to move axially upward against QSLV spring 72, closing gap D until valve stem 58 moves into contact with valve cover 56. Any further pressure increase in brake cylinder pressure chamber 66 will continue to move QSLV diaphragm 54 upward against the bias of spring 72 as valve stem 58 is held stationary by valve cover 56, thereby opening seat A. When seat A is open, brake cylinder air can flow through the cylindrical clearance between stem 58 of valve 52 and a check valve bushing 94. Check valve seat A closes when the sum of the BCM reference pressure in BCM reference pressure chamber 68 acting over the upper area of QSLV diaphragm 54 plus the force of QSLV spring 72 is equal to or greater than the brake cylinder pressure in brake cylinder pressure chamber 66 acting on the underside of diaphragm 54. In this arrangement, the reference pressure is equal to the brake cylinder pressure minus the QSLV setting (e.g., nominally 10 psi) minus the amount of the check valve opening times the QSLV spring rate K. This results in a definable pressure offset equal to:

$$\text{Pressure Offset} = [(\text{height } D - \text{height } C) * K]/(\text{wetted area of the diaphragm})$$

Figure 3:
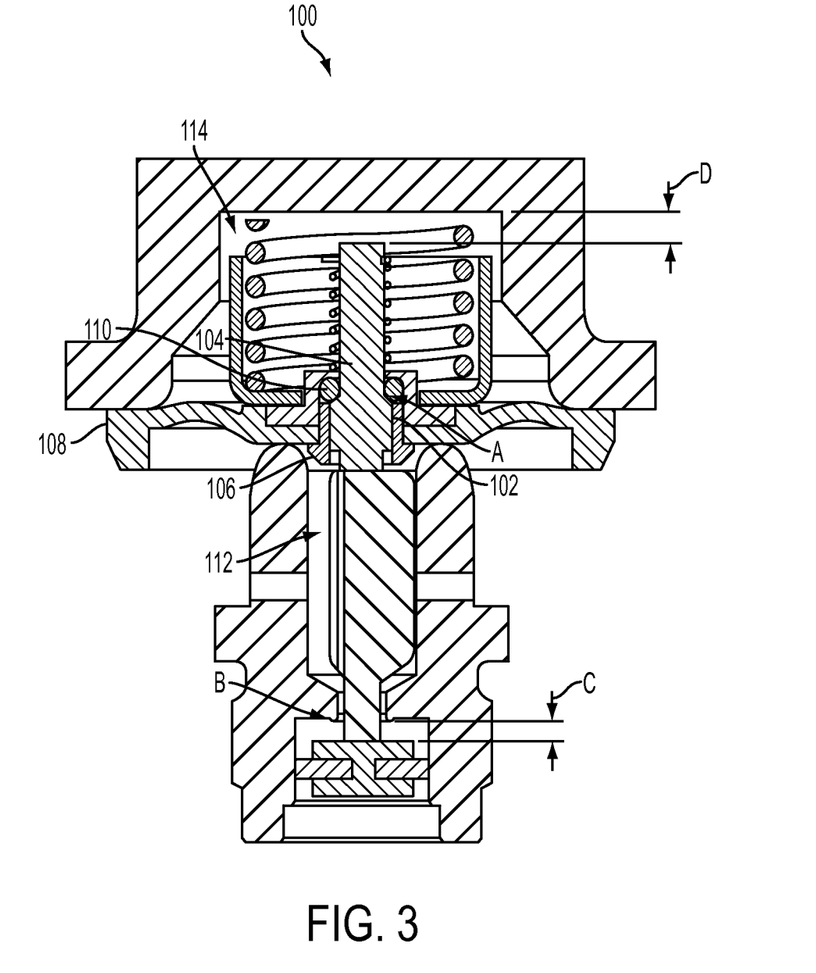
FIG. 3 is a cross-sectional view of a third embodiment of a combined BCM reference pressure charging check valve and quick service limiting valve according to the present invention.

Referring to FIG. 3, another embodiment of a combined quick service check valve and brake cylinder maintaining valve 100 has many of the same components as valve 50, but instead of check valve 52, valve 100 includes a check valve seat A that is defined by a check valve 102 having a tapered cylindrical check valve stem 104 that passes through a check valve stem guide 106 in QSLV diaphragm 108 to define a cylindrical clearance therebetween. The cylindrical clearance is selectively opened and closed when check valve 102 is moved upwardly so that an O-ring is brought into sealing engagement with the cylindrical clearance. When check valve seat A is open, brake cylinder air flows from a brake cylinder pressure chamber 112 through the cylindrical clearance positioned between check valve stem 104 and check valve stem guide 106 and into a BCM reference pressure chamber 114 positioned on the top of QSLV diaphragm 108. Check valve 102 closes when the reference pressure is sufficient to restore force balance as detailed above. A second seat B operates as discussed above with respect to system 50.

Figure 4:
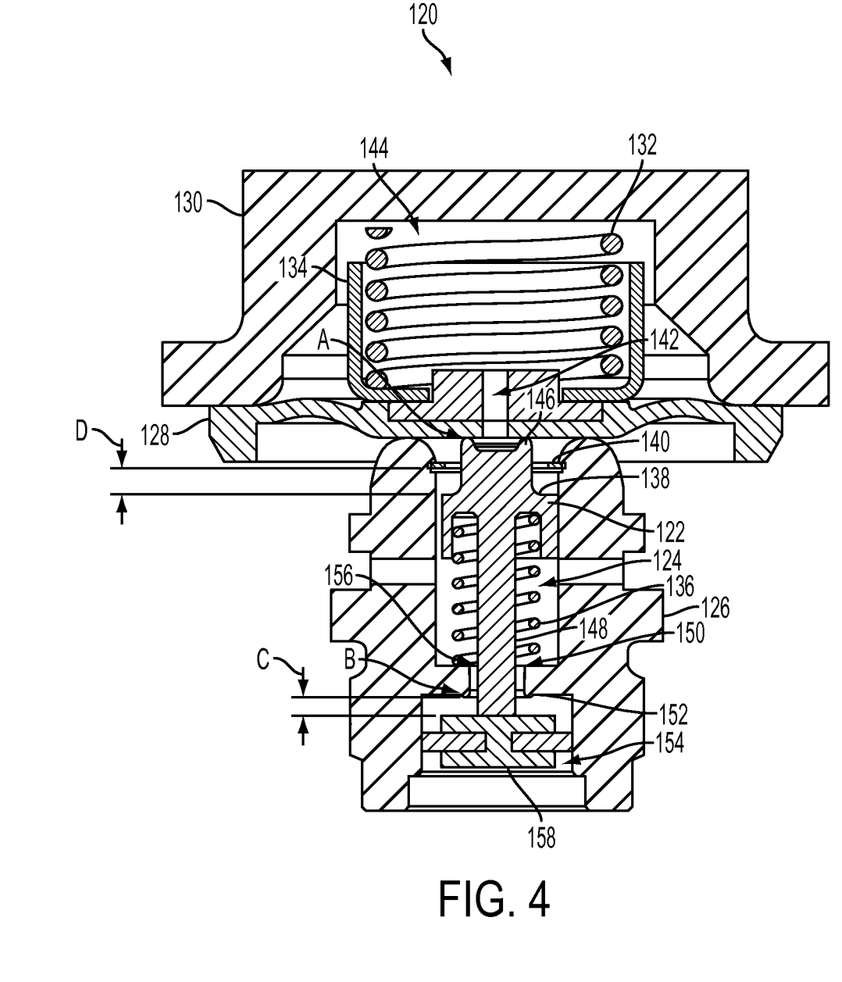
FIG. 4 is a cross-sectional view of a fourth embodiment of a combined BCM reference pressure charging check valve and quick service limiting valve according to the present invention.

Referring to FIG. 4, a further embodiment of a combined quick service check valve and brake cylinder maintaining valve 120 comprises a check valve assembly 122 housed in a brake cylinder pressure chamber 124 of a bushing 126 and sealed against a resilient QSLV diaphragm 128 positioned in a valve cover 130 above brake cylinder pressure chamber 124 to define a first seat A. QSLV diaphragm 128 is biased downwardly by a QSLV spring 132 positioned in a spring guide 134 within valve cover 130. Check valve 122 is held in sealing engagement with QSLV diaphragm 128 by a check valve spring 136 that is also positioned in brake cylinder pressure chamber 124 of bushing 126. Check valve 122 is moveable upwardly through a distance D as QSLV diaphragm 128 until a shoulder 138 of check valve stem 122 engages a retaining ring 140 positioned in the bore of bushing 126. When check valve stem 122 engages retaining ring 140 positioned in the bore of bushing 126, valve stem 122 and diaphragm 128 separate, thereby opening seat A. A passage 142 formed through diaphragm 128 allows for communication between brake cylinder pressure chamber 124 positioned below diaphragm 128 and a BCM reference pressure chamber 144 positioned above diaphragm 128 when seat A is opened. Seat A is preferably formed by a profiled cylindrical seat surface 146 formed on the upper end of check valve 122 to securely seal against resilient QSLV diaphragm 128.

The opposing end of check valve 122 includes a post 148 extending through an internal passageway 150 and a bead seat 152 in the bore of bushing 126. Post 148 further extends into a quick service pressure chamber 154 in a lower portion of the bore of bushing 126. Post 148, as in prior embodiments, provides for a clearance gap 156 with passageway 150 and extends into quick service pressure chamber 154 to engage a check 158 that is biased upwardly as in prior embodiments to define a second seat B. Check 158 can move upwardly a distance C before closing against bead seat 152, and thus closing clearance gap 156 of passageway 150. Seat B thus allows for communication between quick service pressure chamber 154 and brake cylinder pressure chamber 124 when post 148 has opened seat B, and closes communication between chambers 124 and 148 when post 148 is withdrawn and check 158 closes against bead seat 152.

As brake cylinder pressure increases in system 120, QSLV diaphragm 128 is biased against QSLV spring 132 by air pressure in brake pressure chamber 124. As QSLV diaphragm 128 is compressed upwardly, check valve 122 will move through distance D until shoulder 138 engages retaining ring 140. Any additional brake cylinder pressure increases will further compress QSLV diaphragm 128 against QSLV spring 132, thereby opening seat A as valve 122 can no longer move and will separate from diaphragm 128, thereby opening passage 142 at seat A. When check valve seat A is open, brake cylinder air may flow from brake pressure chamber 124 through open seat A, and then through passage 142 formed in diaphragm 128, to reach BCM reference pressure chamber 144 positioned above QSLV diaphragm 128. Check valve 122 closes when the reference pressure is sufficient to restore force balance as detailed in the second embodiment above. Seat B operates as explained above with respect to prior embodiments.

Figure 5:
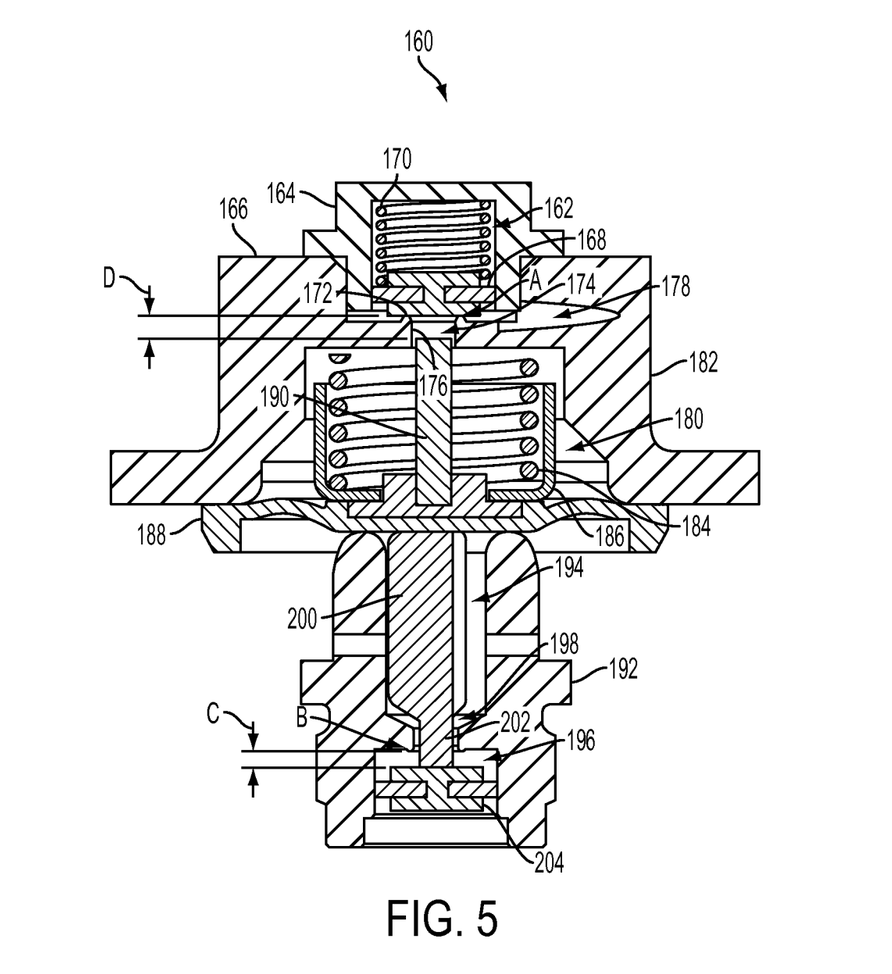
FIG. 5 is a cross-sectional view of a fifth embodiment of a combined BCM reference pressure charging check valve and quick service limiting valve according to the present invention.

In yet another embodiment of the present invention, a combined quick service check valve and brake cylinder maintaining valve 160 comprises a check valve assembly 162 positioned in an upper portion 1 of a QSLV cap 166 and having a first seat A formed from a check 168 that is biased downwardly by a check valve spring 170 for selective engagement with a bead seat 172. Bead seat 172 encloses an annular passage 174 formed through a shoulder 176 in QSLV cap 166. Passage 174 permits communication between a brake cylinder pressure chamber 178 associated with upper portion 164 of cap 166 and a BCM reference pressure chamber associated with the lower portion 182 of cap 166. Spring 170 is biased so that seat A is normally in a closed position.

BCM reference pressure chamber 180 in lower portion 186 of cap 166 contains a QSLV spring 184 positioned in a spring guide 186 that engages a QSLV diaphragm 188 positioned in the lower side of BCM reference pressure chamber 180. A stem 190 associated with diaphragm 188 extends upwardly through BCM reference pressure chamber 180 and into passageway 174 so that movement of diaphragm 188 upwardly against the bias of spring 184 will cause post 190 to move through a distance D to engage check 168 and open seat A. Distance D defines the amount of BCM pressure offset and is controlled by the length of check valve stem 190 and the distance to check valve 162.

A bushing 192 is positioned below diaphragm 188 and includes an upper portion defining a brake cylinder chamber 194 that is separated from a lower portion defining a quick service pressure chamber 196 by a narrow passageway 198. A stem 200 having a lower post 202 is positioned in brake cylinder chamber 194 so that it engages diaphragm 188 at its upper end and post 202 extends through passageway 198 into quick service pressure chamber 196. Quick service pressure chamber 196 includes a check 204 that is moveable through distance C to close of a second seat B, and thus passageway 198, so that communication between brake cylinder pressure chamber 194 and quick service pressure chamber 196 is also closed as discussed in prior embodiments.

As the brake cylinder pressure increases, QSLV spring 184 compresses until distance D is zero. Additional increase of brake cylinder pressure will further compresses QSLV diaphragm 188 and spring 184, thereby opening check valve 162 at seat A. When check valve seat A is open, brake cylinder air flows through open seat A into BCM reference pressure chamber 180 on the top of QSLV diaphragm 188. Check valve 162 closes when the reference pressure is sufficient to restore force balance, as explained in the other embodiments above.

What is claimed is:

1. A brake cylinder maintaining valve, comprising:
   a first seat for selectively allowing communication between a brake cylinder pressure chamber and a brake cylinder maintaining pressure chamber such that, when the first seat is open, pressure will flow between the brake cylinder pressure chamber and the brake cylinder maintaining pressure chamber and, when the first seat closed, pressure will not flow between the brake cylinder pressure chamber and the brake cylinder maintaining pressure chamber;
   a second seat for selectively allowing communication between the brake cylinder pressure chamber and a quick service pressure chamber such that, when the second seat is open, pressure will flow between the brake cylinder pressure chamber and the quick service pressure chamber and, when the second seat is closed, pressure will not to flow between the brake cylinder pressure chamber and the quick service pressure chamber;
   a diaphragm positioned between the brake cylinder pressure chamber and the brake cylinder maintaining pressure chamber that is biased against a first predetermined amount of pressure in the brake cylinder pressure chamber;
   wherein the first seat is formed in part by a needle passing through the diaphragm and having a channel therethrough that is in communication with the brake cylinder maintaining pressure chamber at one end and is open on the opposing end;
   wherein the first seat is further formed in part by a check positioned in the quick service pressure chamber, wherein the check is biased toward the needle to close the open end of the channel of the needle, thereby closing the first seat;
   wherein the first seat is biased to be closed and opens in response to the first predetermined amount of pressurization of the brake cylinder pressure chamber and the second seat is biased to be open and closes in response to a second predetermined amount of pressurization of the brake cylinder pressure chamber;

wherein movement of the diaphragm and needle toward the brake cylinder maintaining pressure chamber allows the check to move and close the second seat, thereby preventing communication between the brake cylinder pressure chamber and the quick service pressure chamber;

wherein additional movement of the diaphragm toward the brake cylinder maintaining pressure chamber will separate the open end of the channel of the needle from the check and bring the open end of the channel into communication with the brake cylinder pressure chamber, thereby opening the first seat and allowing communication between the brake cylinder pressure chamber and the brake cylinder maintaining pressure chamber.

2. The valve of claim 1, wherein the diaphragm positioned between the brake cylinder pressure chamber and the brake cylinder maintaining pressure chamber is biased by a spring.

3. The valve of claim 2, wherein the spring provides a force sufficient to close the first seat if the pressure in the brake cylinder pressure chamber is less than ten pounds per square inch.

4. The valve of claim 3, wherein the spring is positioned in a spring guide.

5. The valve of claim 4, wherein the check is biased toward the needle by a second spring.

* * * * *